(No Model.) 2 Sheets—Sheet 1.
G. G. SKRIVANOW.
BATTERY FOR GENERATING ELECTRICITY.
No. 303,237. Patented Aug. 5, 1884.
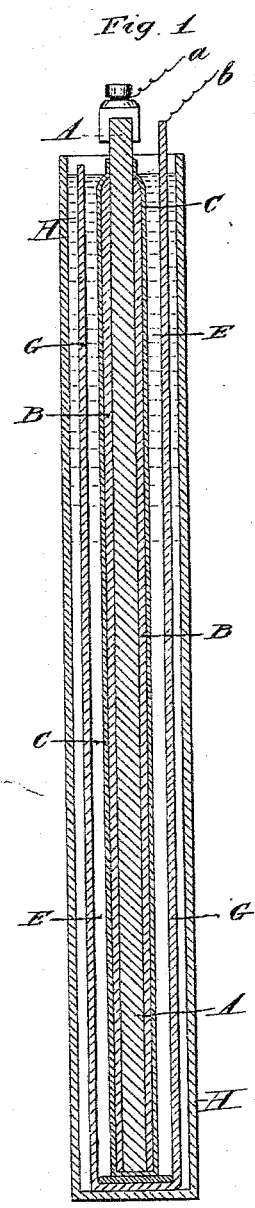
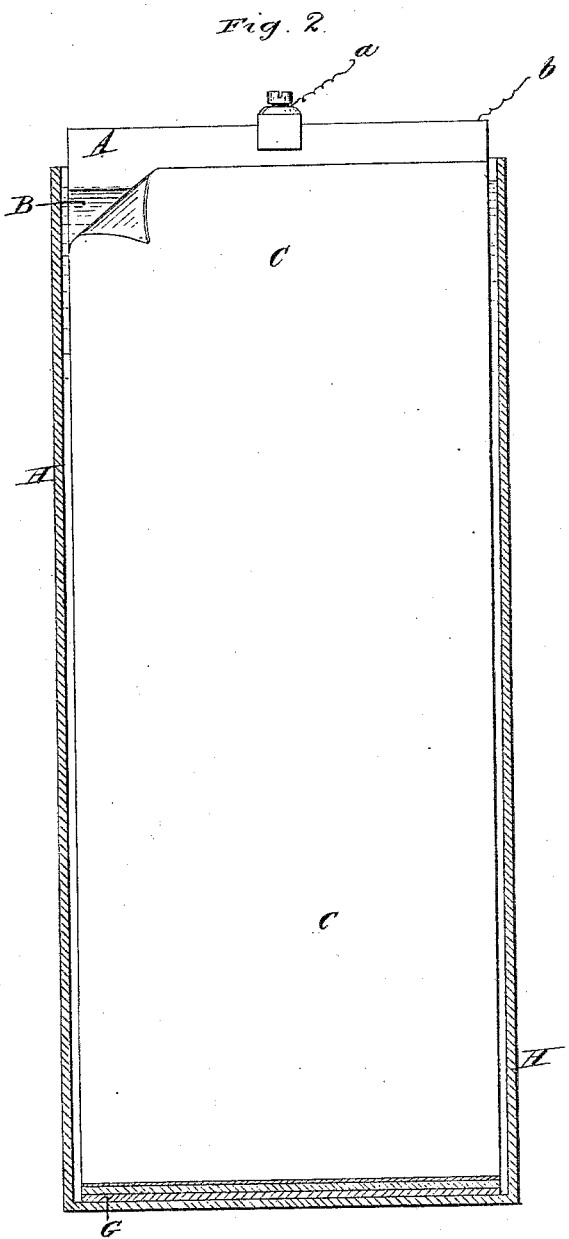
Witnesses:
E. A. Dick
J. Walter Blandford.
Inventor:
Gregoire G. Skrivanow
by Marcellus Bailey
his attorney.

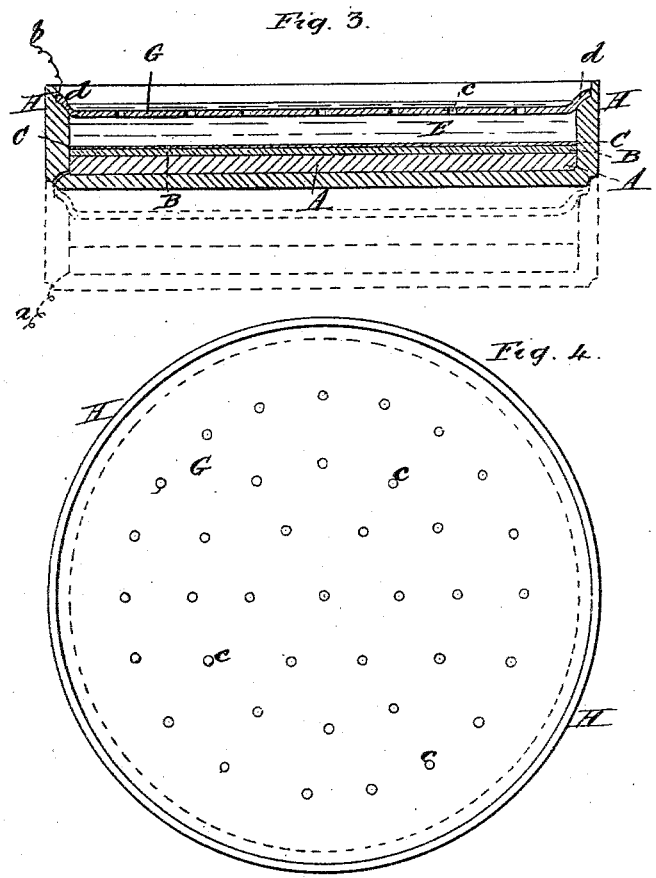

UNITED STATES PATENT OFFICE.

GREGOIRE GEORGE SKRIVANOW, OF PARIS, FRANCE.

BATTERY FOR GENERATING ELECTRICITY.

SPECIFICATION forming part of Letters Patent No. 303,237, dated August 5, 1884.

Application filed January 3, 1883. (No model.) Patented in England September 19, 1882, No. 4,460.

*To all whom it may concern:*

Be it known that I, GREGOIRE GEORGE SKRIVANOW, a subject of the Emperor of Russia, and residing at Paris, in the Republic of France, have invented certain Improvements in and Connected with Batteries for Generating Electricity, (for which I have obtained patent in Great Britain, No. 4,460, dated September 19, 1882,) of which the following is a specification.

The object of my invention is to produce a battery the activity or power of which is capable of being regenerated. According to my said invention, the battery is composed as follows: A plate or disk of agglomerated carbon, or carbon from gas-retorts, or graphite or other suitable form of carbon, is taken and covered on both sides with chloride of silver to constitute the electro-negative element. The carbon plate or element thus prepared is immersed in a solution of hydrate of potassium or of hydrate of sodium marking from about 1.30 to about 1.45 Baumé, the quantity of hydrate amounting on an average to from about thirty to forty per cent. of the weight of the water or solvent, the whole being at a temperature of about 15° centigrade. In proximity to and preferably opposite each side of the carbon is arranged the electro-positive element which is to be decomposed by electric action, such element consisting of a piece or plate of zinc, which is immersed in the same bath or liquid as is the carbon coated with chloride of silver. A battery thus constituted is capable, when the circuit is completed, of supplying a constant and very powerful current of electricity. The superficial area of the electrodes and the space between them are determined by the effect that it is desired to produce. The chemical reactions which take place in this couple are of a multiple nature, for when the couple is immersed in a somewhat concentrated solution of hydrate of potassium or sodium the chloride of silver on the carbon passes partially to the condition of brown or black oxide, so that after remaining some considerable time in the exciting-liquid the plate of carbon becomes covered with a mixture of argentic chloride, and oxide and argentous chloride is also found. On closing the circuit the chloride of silver then becomes reduced to a spongy metallic state and adheres slightly to the surface of the carbon, while at the same time zinc passes into the alkaline solution in the condition of a chloride and forms a soluble combination of oxide of zinc with the alkali. In order to avoid waste of silver, the carbon is wrapped in or protected by asbestus paper or cloth, or is placed in a porous cell. A powerful couple is thus obtained, possessing a high electro-motive force or tension, which varies according to the degree of concentration of the exciting solution and presents very little internal resistance. When the battery is exhausted and the salt of silver completely reduced to the metallic state, it will suffice to plunge the carbon, together with its envelope, (after washing it in water,) into a chloridizing-bath, in order to restore the metallic silver covering the surface of the carbon to the condition of chloride of silver, and thus reinvest the battery with its original power, when the carbon element thus treated is washed in water and replaced in the cell containing the exciting-liquid. These alterations of reduction of the chloride of silver during the working of the battery and the subsequent reconversion into chloride in the bath may be repeated indefinitely, as they are effected without waste of metal. The chloridizing-bath employed for reconversion into chloride, as aforesaid, is composed of nitric acid and hydrochloric acid, or chloride of sodium dissolved in a small quantity of water. In using hydrochloric acid I have found the following proportions to answer well: nitric acid one hundred parts, hydrochloric acid five or six parts, and water thirty parts, by weight; but I do not limit myself to these precise materials and proportions as others which will effect the conversion into chloride may be employed for the same purpose— for example, a bath composed of chloro-chromate of potassium and nitric or sulphuric acid forms an excellent bath for this purpose. In order to obtain the active liquid for the battery, the hydrate of potassium or of sodium may be dissolved in glycerine, and this alkaline solution may be employed in place of the aqueous solution hereinbefore mentioned.

In order that my invention may be properly understood, I have annexed hereto a sheet of drawings in which I have illustrated, as examples, two forms which my improved battery may take; but I wish it to be understood that I do not limit myself to the said forms.

Figure 1 is a vertical section of a single cell with vertical elements constituted according to this invention, and Fig. 2 is a section taken at right angles to the section in Fig. 1. Fig. 3 is a transverse section of a circular cell with horizontal elements, and Fig. 4 is a plan of the same.

In the arrangement illustrated in Figs. 1 and 2 a carbon plate, A, is covered on both sides with a coating, B, of chloride of silver, and outside this coating is an envelope, C, of asbestus paper or cloth. The electro-negative element thus prepared is immersed in an exciting-liquid, E, composed of the solution of hydrate of potassium or sodium, hereinbefore described, together with an electro-positive element, G, consisting of a plate of zinc bent round, so as to face both sides of the carbon element A. The two elements and the liquid are contained in a cell or vessel, H, of ebonite or other suitable material, and when the circuit is completed through conducting-wires $a$ $b$, in the usual manner, a constant current of considerable power is generated. According to the arrangement illustrated in the drawings, the zinc plate rests upon the bottom of the vessel and the carbon plate rests upon a piece of non-conducting material laid on the bend of the zinc plate, but it is evident that the elements may be supported or suspended by any other convenient arrangement.

In the arrangement illustrated in Figs. 3 and 4 the cell is similar in principle to that hereinbefore described with reference to Figs. 1 and 2; but the plates or elements are in the form of disks, and the exciting-liquid in which they are immersed is contained in a shallow vessel, H. The negative element A, in the form of a flat disk, is laid directly on the bottom of the vessel H and is covered on the upper side with the chloride of silver B. A disk, C, of asbestus paper or cloth is laid over the chloride of silver, and a disk, G, of zinc is supported at a suitable distance from the carbon by a ledge or recess formed in the sides of the vessel, as shown at $d$, with its upper side below the surface of the liquid. Holes $c$ may be formed in the zinc plates to allow of the free circulation of the liquid. A convenient form of battery is obtained by employing a series of these circular cells arranged one above the other, as indicated by the dotted lines in Fig. 3, the elements being connected together after the ordinary manner.

It will be understood that in any arrangement of battery according to my invention any number of cells may be used and connected up in quantity or tension, as desired.

Having now described and particularly ascertained the nature of my said invention and the manner in which the same is or may be used or carried into effect, I would observe, in conclusion, that what I consider to be novel and original, and therefore claim as my invention, is—

A battery for generating electricity, containing a negative element coated or covered with chloride of silver, and having potassic or sodaic caustic alkaline solution as the liquid or bath in which the positive and negative elements are immersed, substantially as hereinbefore set forth.

In testimony whereof I have signed my name to this specification in the presence of two subscribing witnesses.

GREGOIRE G. SKRIVANOW.

Witnesses:
   CHAS. MILLS,
      47 *Lincoln's Inn Fields, London.*
   WM. JOHN WEEKS,
      31 *Lombard Street, London.*